No. 809,335. PATENTED JAN. 9, 1906.
H. S. SWANSON.
CULTIVATOR.
APPLICATION FILED DEC. 15, 1904.
2 SHEETS—SHEET 1.
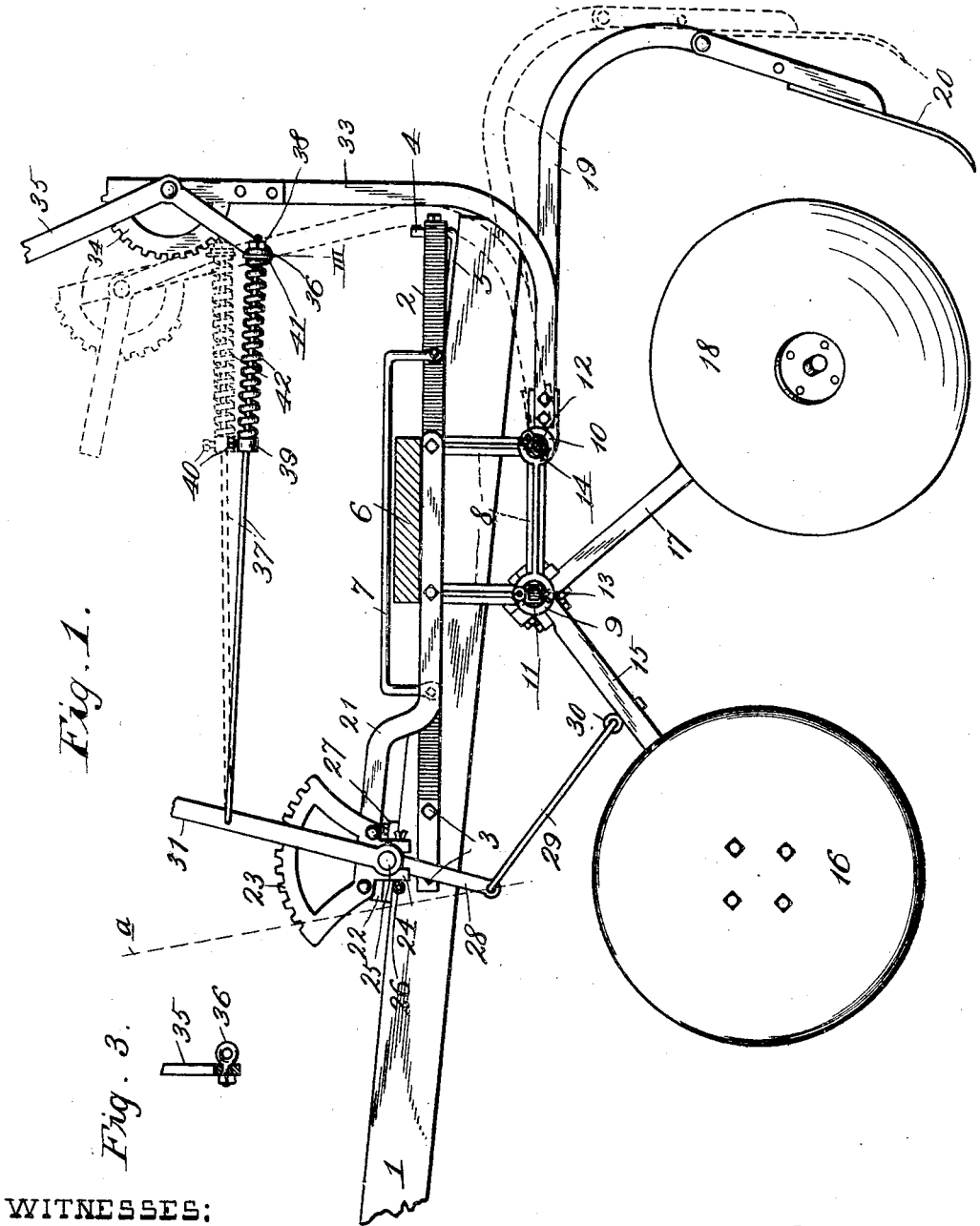
WITNESSES:
R. E. Hamilton.
Jesse Moore
INVENTOR,
H. S. Swanson
By F. G. Fischer
Atty.

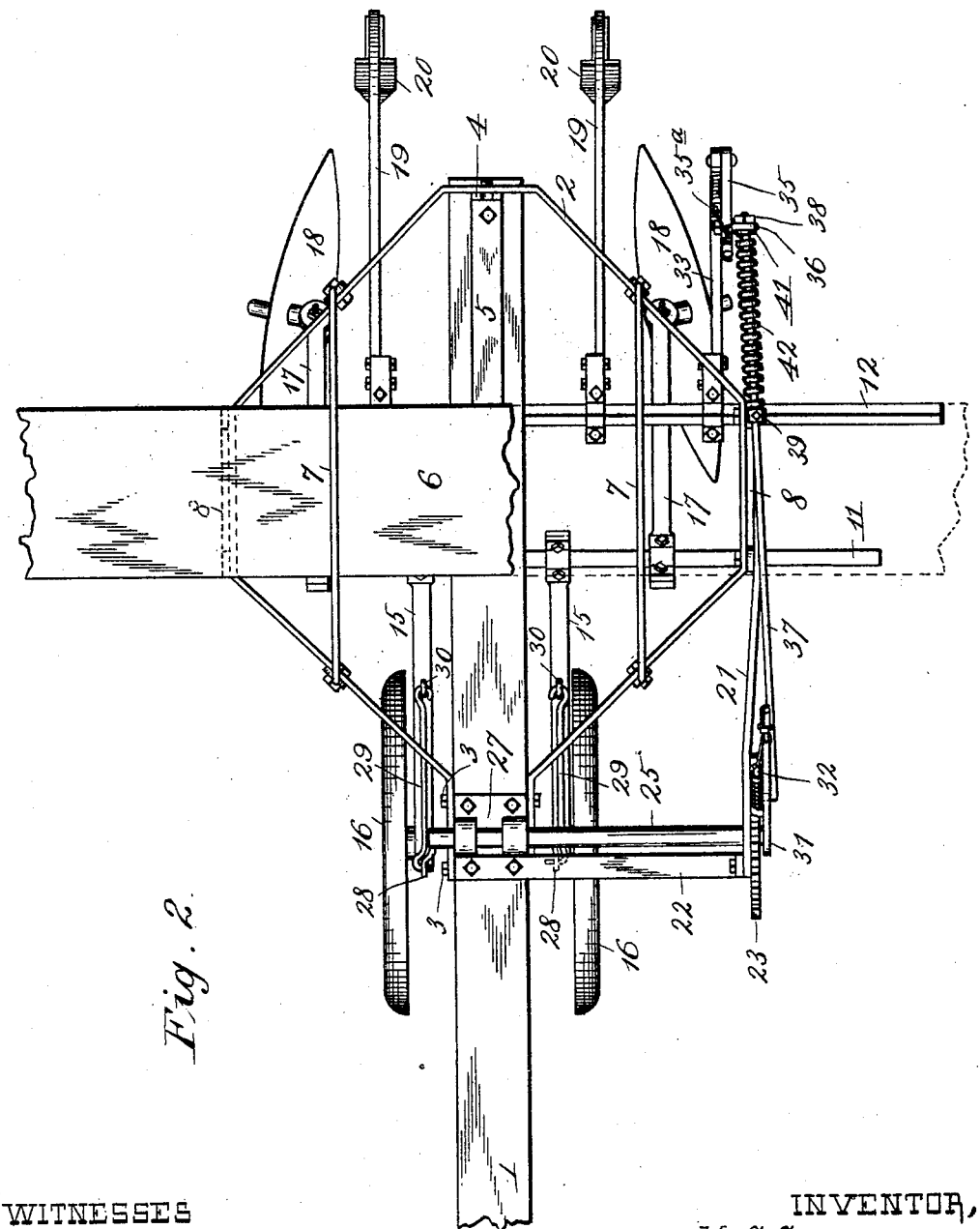

UNITED STATES PATENT OFFICE.

HERMAN S. SWANSON, OF SHENANDOAH, IOWA, ASSIGNOR TO SWANSON MFG. CO., OF IOWA.

CULTIVATOR.

No. 809,335.     Specification of Letters Patent.     Patented Jan. 9, 1906.

Application filed December 15, 1904. Serial No. 236,944.

*To all whom it may concern:*

Be it known that I, HERMAN S. SWANSON, a citizen of the United States, residing at Shenandoah, in the county of Page and State of Iowa, have invented certain new and useful Improvements in Cultivators, of which the following is a specification.

My invention relates to improvements in cultivators; and its principal feature resides in mechanism for obtaining either independent or simultaneous adjustment of the disk and shovel shafts forming part of the cultivator.

By employing my improved mechanism the cultivator-shovels can be raised from the soil independently of the disks, so that they need not retard or interfere with the turning of the machine nor enter the soil too deeply when said machine is crossing depressions or uneven places in the field.

The invention further consists in supports for the seat-plank, which latter adjustably secures the two gangs of the cultivator together in the well-known manner.

In the accompanying drawings, which illustrate the invention, Figure 1 represents a side elevation of a cultivator-gang provided with my improvements. Fig. 2 is a plan view of the same. Fig. 3 is a vertical section taken on line III of Fig. 1, showing the lower end of a lever provided with an eyebolt employed in carrying out my invention.

As the gangs of the cultivator are in duplicate, I have shown and will proceed to describe but one of them.

1 designates a tongue.

2 designates a frame of octagonal form secured at its forward ends to the sides of the tongue by bolts 3 and fastened at its rear end to the upturned end 4 of a bar 5, bolted to the top of the tongue.

6 designates the seat-plank for adjustably connecting the gangs in the well-known manner. Said seat-plank is loosely secured upon frame 2 by means of inverted-U-shaped rods 7, bolted at their lower ends to the forward and rear portions of the frame, as plainly shown in Fig. 2.

8 designates a pair of U-shaped hangers bolted at their upper ends to the sides of frame 2 and provided with forward and rear bearings 9 and 10, respectively, in which rocker-shafts 11 and 12, respectively, are mounted, said rocker-shafts being preferably held from longitudinal movement by cotter-pins 13 14, arranged in contact with the outer ends of bearings 9 and 10.

15 designates a pair of wheel-arms secured at their upper ends to shaft 11 and provided at their lower ends with ground-wheels 16, upon which the gang is carried.

17 designates a pair of disk-arms secured at their upper ends to shaft 11 and arranged at an angle of ninety degrees to the wheel-arms 15.

18 designates a pair of disks mounted at the lower ends of arms 17.

19 designates a pair of shovel-beams secured at their upper forward ends to shaft 12 and provided at their lower ends with shovels 20.

Wheel-arms 15, disk-arms 17, and shovel-beams 19 have independent lateral adjustment upon their respective shafts, so that they may be properly set to suit the condition of the corn under cultivation.

21 designates a longitudinal brace bolted at its rear end to the inner side of frame 2 and supported at its raised forward end by a transverse brace 22, extending laterally from the tongue.

23 designates a notched segment bolted to the forward end of brace 21 and provided at its under side with a depending bearing 24, in which one end of a transverse shaft 25 is retained by means of a cotter-pin 26, the opposite end of said shaft being mounted in a bearing 27, secured upon the tongue. Shaft 25 is provided with a pair of depending crank-arms 28, having eyes in their lower ends for the reception of the upper bent ends of draft-rods 29, which latter are hooked at their lower ends into eyebolts 30, secured to the wheel-arms.

31 designates a primary hand-lever rigidly secured at its lower end to the inner terminal of shaft 25 and provided with a latch 32, adapted to engage any of the notches in segment 23 when said lever is adjusted back and forth.

33 designates a right-angled crank-arm secured at its lower forward end to shaft 12 and provided at its rear upper end with a notched segment 34, to the central portion of which a secondary hand-lever 35 is fulcrumed. Said hand-lever is provided with a latch 35ᵃ, adapted to engage any of the notches in segment 34 when said lever is adjusted either upwardly or downwardly.

36 designates an eyebolt pivotally secured in the lower end of lever 35 for the reception of the rear end of a connecting-rod 37, pivotally secured at its forward end to lever 31. Accidental withdrawal of connecting-rod 37 from eyebolt 36 is prevented by a nut 38, engaging the rear threaded end of said rod and bearing at its forward surface against the eyebolt, as shown in Fig. 1.

39 designates a collar provided with a set-screw 40, whereby it is adjustably secured upon connecting-rod 37.

41 designates a washer loosely arranged on the connecting-rod and bearing against the front surface of eyebolt 36.

42 designates an expansion-spring interposed between collar 39 and washer 41 for the purpose of normally retaining the eyebolt 36 in contact with nut 38. The tension of said spring is regulated by adjusting collar 39 back and forth upon the connecting-rod.

In practice the disks and shovels are simultaneously forced into the soil by adjusting the primary lever 31 to the position shown in Fig. 1. Then, if desired, said disks and shovels may be simultaneously raised from the soil by drawing said primary lever to the position shown by dotted line $a$. If, however, it is preferable to elevate the shovels alone, this result may be accomplished by disengaging latch $35^a$ from segment 34 and pulling hand-lever 35 forwardly and downwardly to the dotted position shown in Fig. 1, where it is held by segment 34, latch $35^a$, connecting-rod 37, and nut 38. As the secondary hand-lever 35 is moved forwardly and downwardly its lower end will push against nut 38, and thus elevate and move the right-angled crank-arm 33 forward, causing it to turn shaft 12 in its bearings and elevate the shovel-beams to the dotted position shown in Fig. 1. When cultivating soil containing rocks and stumps, the shovel-beams may be protected from damage occurring through the shovels contacting with said rocks or stumps by securing latch $35^a$ with any suitable means out of engagement with the notches of segment 34, so that the shovels may pass over the obstructions by compressing spring 42, the tension of which latter is regulated to hold the shovels into the soil until they meet with the obstructions above referred to.

Having thus described my invention, what I claim, and desire to secure by Letters Patent, is—

1. In a cultivator, a rocker-shaft suitably mounted, cultivating appliances suitably secured thereto, a crank-arm also secured to the rocker-shaft, a segment secured to said crank-arm, a hand-lever fulcrumed upon the segment, means for locking said hand-lever and segment together, and means engaging the hand-lever against which the latter is arranged to push.

2. In a cultivator, a rocker-shaft suitably mounted, cultivating appliances suitably secured thereto, a right-angled crank-arm also secured to the rocker-shaft, a segment secured to said crank-arm, a hand-lever fulcrumed upon the segment, means for locking said hand-lever and segment together, and means engaging the hand-lever against which the latter is arranged to push.

3. In a cultivator, a rocker-shaft suitably mounted, cultivating appliances suitably secured thereto, a crank-arm also secured to the rocker-shaft, a segment secured to said crank-arm, a hand-lever fulcrumed upon the segment, means for locking said hand-lever and segment together, and a connecting-rod suitably secured at its forward end and loosely secured at its rear end to said hand-lever.

4. In a cultivator, a rocker-shaft suitably mounted, cultivating appliances suitably secured thereto, a crank-arm also secured to the rocker-shaft, a segment secured to said crank-arm, a hand-lever fulcrumed upon the segment, means for locking said hand-lever and segment together, a connecting-rod suitably secured at its forward end and loosely secured at its rear end to said hand-lever, and a coil-spring embracing said connecting-rod and pressing against the hand-lever.

5. In a cultivator, a rocker-shaft suitably mounted, cultivating appliances suitably secured thereto, a crank-arm also secured to the rocker-shaft, a segment secured to said crank-arm, a hand-lever fulcrumed upon the segment, a connecting-rod suitably secured at its forward end and loosely engaging the hand-lever with its rear end, a collar adjustably secured to said connecting-rod, and an expansion-spring embracing the connecting-rod and interposed between said collar and the hand-lever.

6. In a cultivator, a rocker-shaft suitably mounted, cultivating appliances suitably secured thereto, a crank-arm also secured to the rocker-shaft, a segment secured to said crank-arm, a hand-lever fulcrumed upon the segment, an eyebolt swiveled on the lever, a connecting-rod suitably secured at its forward end and having its rear end extending through the eyebolt, and means for preventing the accidental withdrawal of the connecting-rod from said eyebolt.

7. In a cultivator, two rocker-shafts suitably mounted, cultivating appliances suitably secured thereto, a primary lever fulcrumed upon the cultivator, means connecting said lever to one of said rocker-shafts, a crank-arm secured to the other rocker-shaft, a segment secured to said crank-arm, a secondary hand-lever fulcrumed upon said segment, and a connecting-rod pivotally secured at one end to one of the levers and loosely secured at its opposite end to the other lever.

8. In a cultivator, two rocker-shafts suitably mounted, cultivating appliances suitably secured thereto, a primary lever fulcrumed upon the cultivator, means connecting said lever to one of said rocker-shafts, a segment located beside said primary lever, a longitudinal brace to which said segment is secured, a crank-arm secured to the other rocker-shaft, a segment secured to said crank-arm, a secondary hand-lever fulcrumed upon said segment, and a connecting-rod pivotally secured at one end to one of the levers, and loosely secured at its opposite end to the other lever.

9. In a cultivator, two rocker-shafts suitably mounted, cultivating appliances secured to one of said rocker-shafts, a primary lever fulcrumed upon the cultivator, means connecting said lever to one of said rocker-shafts, wheel-arms secured to one of said shafts, a crank-arm secured to the other rocker-shaft, a secondary hand-lever fulcrumed upon said crank-arm, means for locking said hand-lever to said crank-arm when desired, and a connecting-rod pivotally secured at one end to one of the levers, and loosely secured at its opposite end to the other lever.

10. In a cultivator, two rocker-shafts, one of which is mounted in advance of the other, cultivating appliances suitably secured to one of said shafts, wheel-arms secured to one of said shafts, a transverse shaft mounted upon the cultivator, crank-arms secured to the transverse shaft, a primary hand-lever also secured to the transverse shaft, means connecting the crank-arms to the wheel-arms, a crank-arm secured to the other rocker-shaft, a segment secured to said crank-arm, a secondary hand-lever fulcrumed upon said segment, and a connecting-rod pivotally secured at one end to one of the levers and slidably secured at its opposite end to the other lever.

11. In a cultivator, two rocker-shafts suitably mounted, cultivating appliances suitably secured to one of said shafts, wheel-arms secured to one of said shafts, a crank-arm secured to one of said shafts, a primary lever fulcrumed upon the cultivator, means connecting said lever to the other shaft, and suitable means connecting the crank-arm to said primary lever whereby both may be simultaneously operated or the crank-arm may be operated independently of the primary lever.

12. In a cultivator, two rocker-shafts suitably mounted, cultivating appliances secured thereto, a crank-arm secured to one of said shafts, a primary lever fulcrumed upon the cultivator, means connecting said lever to the other shaft, and resilient means connecting the crank-arm to said primary lever whereby both may be simultaneously operated or the crank-arm may be operated independently of the primary lever.

13. In a cultivator, two rocker-shafts suitably mounted, cultivating appliances secured thereto, a crank-arm secured to one of said shafts, a primary lever fulcrumed upon the cultivator, means connecting said lever to the other shaft, resilient means connecting the crank-arm to said primary lever whereby both may be simultaneously operated or the crank-arm may be operated independently of the primary lever, and means for regulating the tension of said resilient connections.

14. In a cultivator, two rocker-shafts suitably mounted, cultivating appliances secured thereto, a crank-arm secured to one of said shafts, a secondary hand-lever fulcrumed upon said crank-arm, means for locking said lever to the crank-arm when desired, a primary lever fulcrumed upon the cultivator, means connecting said lever to the other shaft, and suitable means connecting the secondary lever to the primary lever whereby both may be simultaneously operated or the secondary lever may be operated independently of the primary lever.

15. In a cultivator, two rocker-shafts suitably mounted, cultivating appliances secured thereto, a crank-arm secured to one of said shafts, a secondary hand-lever fulcrumed upon said crank-arm, means for locking said lever to the crank-arm when desired, a primary lever fulcrumed upon the cultivator, means connecting said lever to the other shaft, and resilient means connecting the secondary lever to the primary lever whereby both may be simultaneously operated or the secondary lever may be operated independently of the primary lever.

16. In a cultivator, two rocker-shafts suitably mounted, cultivating appliances secured thereto, a crank-arm secured to one of said shafts, a secondary hand-lever fulcrumed upon said crank-arm, means for locking said lever to the crank-arm when desired, a primary lever fulcrumed upon the cultivator, means connecting said lever to the other shaft, resilient means connecting the secondary lever to the primary lever whereby both may be simultaneously operated or the secondary lever may be operated independently of the primary lever, and means for regulating the tension of the resilient connections.

17. In a cultivator, an octagonal frame, bearings depending from said frame, rocker-shafts mounted in said bearings, cultivating appliances suitably secured to said shafts, a primary lever fulcrumed upon the cultivator, means connecting said lever to one of said shafts, a right-angled crank-arm secured to the other shaft and extending upwardly and backwardly to the rear of the frame, a secondary lever fulcrumed upon said crank-arm, means for locking said secondary lever to the crank-arm when desired, and a connecting-rod pivotally secured at one end to one of the levers and loosely secured at its opposite end to the other lever.

18. In a cultivator, an octagonal frame, bearings depending from said frame, rocker-shafts mounted in said bearings, cultivating appliances secured to one of said shafts, a crank-arm suitably secured to one of said shafts, a secondary hand-lever fulcrumed upon said crank-arm, means for locking said secondary lever to the crank-arm, a primary lever fulcrumed upon the cultivator, means connecting said lever to the other shaft, and a connecting-rod pivotally secured at one end to one of the levers and loosely secured at its opposite end to the other lever.

19. In a cultivator, two rocker-shafts one of which is mounted in advance of the other, cultivating appliances suitably secured thereto, wheel-arms also secured to the forward shaft, a transverse shaft suitably mounted, crank-arms secured thereto, draft-rods connecting said crank-arms to the wheel-arms, a primary lever also secured to the transverse shaft, a crank-arm secured to the rear rocker-shaft, a segment secured to said crank-arm, a secondary lever fulcrumed upon said segment, and a connecting-rod pivotally secured at one end to the primary lever and loosely secured at its opposite end to the other lever.

20. In a cultivator, two rocker-shafts one of which is mounted in advance of the other, cultivating appliances suitably secured thereto, wheel-arms also secured to the forward rocker-shaft, a forwardly-extending longitudinal brace suitably secured at its rear end to the frame of the machine, a transverse brace secured at its opposite ends to the forward end of the longitudinal brace and the tongue of the machine, a segment secured to the longitudinal brace and provided with a bearing, a transverse shaft journaled at one end in said bearing and at its opposite end in a bearing upon the tongue, depending crank-arms secured to said transverse shaft, draft-rods connecting said depending crank-arms to the wheel-arms, a primary lever rigidly secured to the transverse shaft adjacent to the segment, a crank-arm secured to the rear rocker-shaft, a segment secured to said crank-arm, a secondary lever fulcrumed upon said segment, and a connecting-rod pivotally secured at one end to one of the levers and loosely secured at its rear end to the other lever.

In testimony whereof I affix my signature in the presence of two witnesses.

HERMAN S. SWANSON.

Witnesses:
ERNEST SWANSON,
ELMER SWANSON.